US007344065B1

(12) United States Patent
Graef

(10) Patent No.: US 7,344,065 B1
(45) Date of Patent: Mar. 18, 2008

(54) ATM WITH SECURITY SENSING SYSTEM FOR CASH DISPENSER CUSTOMER INTERFACE GATE

(75) Inventor: H. Thomas Graef, Bolivar, OH (US)

(73) Assignee: Diebold Self-Service Systems division of Diebold, Incorporated, North Canton, OH (US)

(*) Notice: Subject to any disclaimer, the term of this patent is extended or adjusted under 35 U.S.C. 154(b) by 0 days.

(21) Appl. No.: 11/482,313

(22) Filed: Jul. 6, 2006

Related U.S. Application Data

(60) Provisional application No. 60/702,197, filed on Jul. 25, 2005.

(51) Int. Cl.
*G06Q 40/00* (2006.01)

(52) U.S. Cl. .................................................... 235/379

(58) Field of Classification Search ................ 235/379, 235/380, 381, 475, 476–478
See application file for complete search history.

(56) References Cited

U.S. PATENT DOCUMENTS

| | | | | |
|---|---|---|---|---|
| 3,715,569 | A * | 2/1973 | Hicks et al. | 235/381 |
| 4,884,679 | A * | 12/1989 | Graef et al. | 198/718 |
| 5,240,368 | A * | 8/1993 | Graef et al. | 414/788.9 |
| 5,507,481 | A * | 4/1996 | Meyer et al. | 271/240 |
| 6,170,818 | B1 * | 1/2001 | Eastman et al. | 271/184 |
| 6,315,194 | B1 * | 11/2001 | Graef et al. | 235/379 |
| 6,331,000 | B1 * | 12/2001 | Beskitt et al. | 271/3.01 |
| 6,484,380 | B2 * | 11/2002 | Graef et al. | 29/401.1 |
| 2001/0013541 | A1 * | 8/2001 | Modi | 235/379 |
| 2004/0178258 | A1 * | 9/2004 | Scarafile et al. | 235/379 |

* cited by examiner

*Primary Examiner*—Michael G. Lee
*Assistant Examiner*—Tuyen Kim Vo
(74) *Attorney, Agent, or Firm*—Ralph E. Jocke; Daniel D. Wasil; Walker & Jocke

(57) ABSTRACT

An automated banking machine operates to dispense cash to authorized users. The machine includes at least one processor which controls various banking machine devices and operates the machine in response to inputs by customers. A sensor is in operative connection with a gate that controls access through a currency dispensing opening. The at least one processor operates to analyze signals from the sensor and to determine if the gate movement corresponds to a suspect condition. If the at least one processor determines that there is a suspect condition, the machine executes one or more protective actions to minimize the risk of improper activity.

16 Claims, 2 Drawing Sheets

ATM WITH SECURITY SENSING SYSTEM FOR CASH DISPENSER CUSTOMER INTERFACE GATE

CROSS REFERENCE TO RELATED APPLICATION

This application claims benefit pursuant to 35 U.S.C. §119(e) of Provisional Application 60/702,197 filed Jul. 25, 2005

TECHNICAL FIELD

This invention relates to automated transaction machines. Specifically, the invention relates to an automated transaction machine capable of monitoring movement of a gate controlling access through an opening in the housing of the automated banking machine.

BACKGROUND ART

Automated transaction machines are known in the prior art. A common type of automated transaction machine is an automated teller machine (ATM). ATMs have been developed which are capable of performing a variety of transactions including the dispensing of currency notes. ATMs are commonly used by individuals to receive cash from their accounts, to pay bills, to transfer cash between accounts, and to make deposits. Certain ATMs also have the capability of delivering and receiving various types of sheet materials. For example, some ATMs dispense materials such as tickets, travelers' checks, money orders, bank checks, scrip, stamps, vouchers, gaming materials, lottery tickets, transit tokens, or other sheet materials stored in or produced by the machine. Other types of transaction machines dispense notes which are alternatively referred to herein as bills, and other types of sheets to users such as bank tellers, cashiers, and other service providers. Automated transaction machines generally dispense such materials while operating to enable appropriate charges and credits to be applied to the respective accounts of the customer, the machine owner, and/or the provider of the dispensed materials. For purposes of this description an automated transaction machine, automated banking machine or ATM will be considered as any machine that carries out transactions including transfers of value.

Customers also commonly receive from an ATM a printed sheet which is a receipt indicating the particulars of the transactions they have conducted at the machine. In addition customers may request and receive from some ATMs a more detailed statement of transactions conducted on their account.

ATMs currently in use often have different areas on the machine where sheets are received from or delivered to a customer. For example, most machines include one area for delivering bills to a customer and another area for receiving deposits.

ATMs that dispense currency bills or other types of sheets representative of value are generally constructed to prevent unauthorized persons from accessing the supply of sheets held inside the machine. ATMs typically include a generally secure chest or enclosure. The interior of the enclosure includes storage areas for currency bills and other types of sheet materials. ATMs may include several different passageways, devices and transports which operate to deliver sheet materials from storage areas in the machine to users.

Unfortunately, some unscrupulous individuals on rare occasions are successful in tampering with ATMs. Sometimes this is done by placing objects through a sheet delivery opening. Such tampering may corrupt the operation of the machine and prevent the final delivery of sheet materials to the customer. Therefore, a customer's account may be charged the value of the requested sheet materials without the customer ever receiving the sheet materials. In some cases, such unscrupulous individuals may return to the ATM after the sheets of an authorized user have become trapped inside the machine near the delivery opening and attempt to extract them.

In many ATMs, access through the sheet delivery opening is controlled by a movable gate. In normal operation of the ATM, the gate may be controlled to move to open the delivery opening when the requested sheet material is ready to be presented to the customer. The gate may be constructed so that when the sheet material that is presented to the user is removed, the gate returns to a closed position.

In instances of tampering when sheets are being presented, the unscrupulous individual may move the gate to place objects inside the ATM through the opening. Such objects may trap bills that one or more users may subsequently request the ATM to dispense. At a later time, the unscrupulous individual may return and reopen the gate to extract any trapped bills. The fact that protective gates must open to at least provide access to the ATM interior during a legitimate transaction presents a potential way for criminals to try to attack the machine.

Thus, there exists a need for an automated transaction machine that reduces the risk of machine tampering.

DISCLOSURE OF INVENTION

It is an object of an exemplary embodiment to provide an automated banking machine.

It is a further object of an exemplary embodiment to provide an automated banking machine with an improved system for sensing movement of a gate mechanism.

It is a further object of an exemplary embodiment to cause an automated banking machine to undergo protective measures when a suspect condition is sensed.

It is a further object of an exemplary embodiment to provide a method for improving the operation of an automated banking machine.

Further objects of exemplary embodiments will be made apparent in the following Best Modes for Carrying Out Invention and the appended claims.

The foregoing objects are accomplished in an exemplary embodiment by monitoring the condition of a gate controlling access through an opening in the housing of an automated banking machine.

In an exemplary embodiment, the gate moves responsive to the operation of at least one processor in the machine, from a closed position wherein the gate blocks access through the opening to an open position. With the gate in the open position, the machine is operated in response to the at least one processor to extend a stack of currency bills outward from the machine through the opening. With the stack of bills extending through the opening, the gate is in supporting connection with the stack and biased toward the closed position. A sensor in operative connection with the gate generates at least one signal corresponding to the extent that the gate is disposed from the closed position. The generated signal is analyzed by at least one processor in the machine to determine if the generated signal corresponds to a suspect condition.

If the generated signal corresponds to a suspect condition, the at least one processor causes the machine to take one or more protective actions. The protective action may be a machine verification process to determine if the currency path is unobstructed. Other protective actions include operating an alarm mechanism, operating a video image capture system, and generating a service request.

In an exemplary embodiment, a method of operating an automated banking machine includes generating through a sensor in operative connection with a gate, a signal corresponding to an extent of movement of the gate, wherein the gate controls access through a currency delivery opening of the banking machine. The gate is operable to move from a closed position in which the gate blocks access through the currency delivery opening, to an open position. The generated signal is analyzed to determine if the generated signal corresponds to a suspect condition.

In an exemplary embodiment, a method of operating an automated banking machine includes receiving a transaction request from a machine user involving the dispense of at least one sheet. The sheet is moved from a storage area in the machine to a delivery position, and a gate which controls access through an opening in a housing is moved from a closed position to an open position. With the sheet extended through the opening, the gate engages the sheet, and is biased toward the closed position. A sensor, in operative connection with the gate, generates at least one signal corresponding to the extent the gate is disposed from the closed position. The generated signal(s) is analyzed through operation of at least one processor in the machine, to determine if the signal corresponds to a suspect condition. Responsive to determining that the signal(s) corresponds to a suspect condition, the machine operates to take at least one protective action.

In an exemplary embodiment, a method of operating an automated banking machine includes generating through at least one sensor in operative connection with a gate, a plurality of first signals corresponding to normal movement of the gate, storing the plurality of generated first signals in at least one data store through operation of a processor of the automated banking machine. The method further includes generating subsequent signals corresponding to a subsequent movement of the gate, operating the at least one processor to analyze the subsequent signals relative to data corresponding to the plurality of stored first signals, and determining through operation of the processor whether the subsequent signals correspond to a suspect condition.

In one exemplary embodiment, the stored data corresponding to the first signals are indicative of the extent that the gate is disposed from the closed position in normal operation. In another exemplary embodiment, the stored data corresponding to the first signals are indicative of the amount of time that the gate is disposed from the closed position. Of course these approaches are exemplary.

One exemplary embodiment includes computer software that is operative in at least one processor of a banking machine to cause the machine to operate as described above.

One exemplary embodiment includes machine readable media bearing computer executable instructions operative to cause at least one processor to carry out the methods as described above.

BEST MODES FOR CARRYING OUT INVENTION

Figure 1:
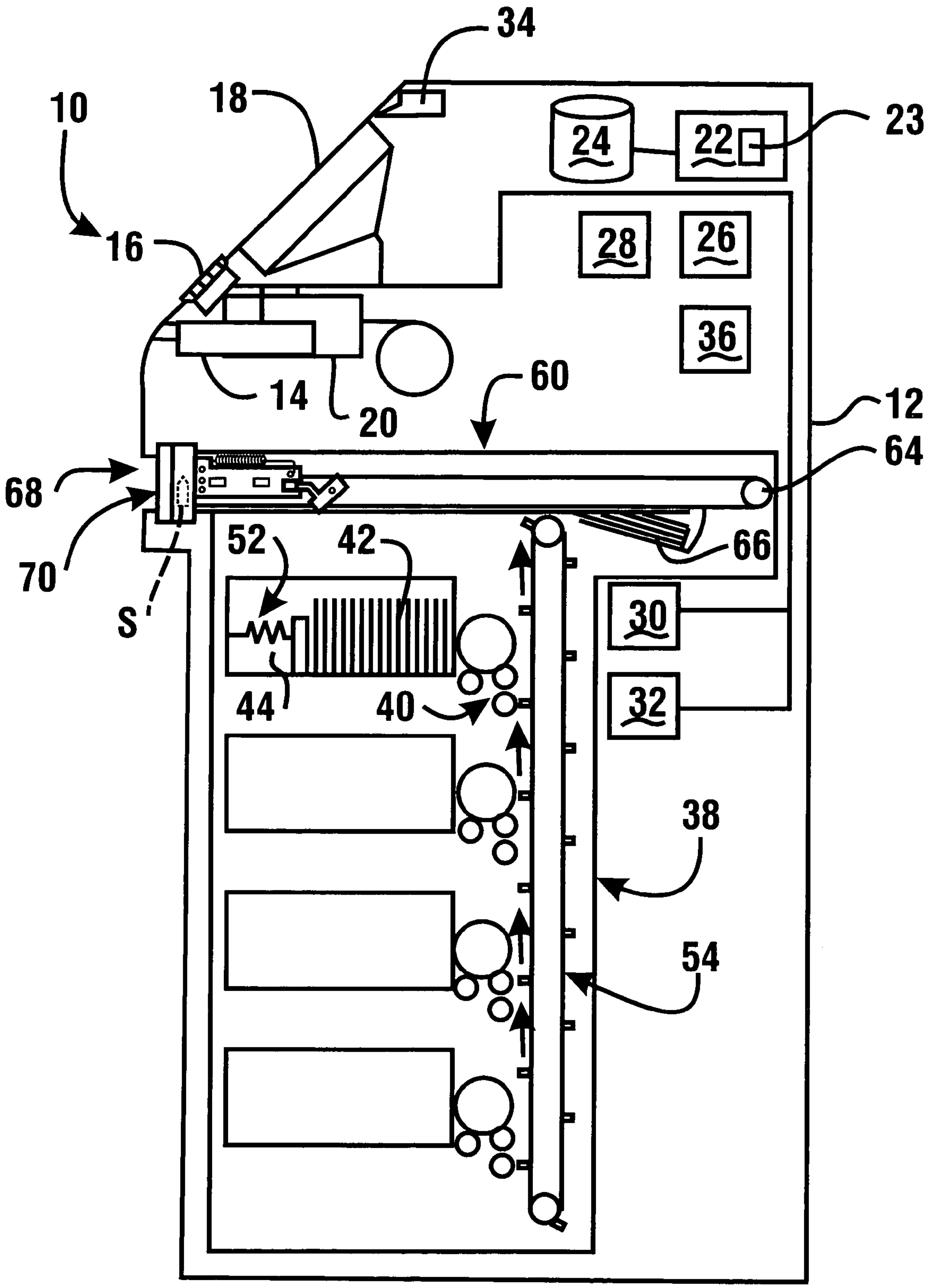
FIG. 1 is a side schematic view of an exemplary automated banking machine incorporating features described herein.

Referring now to the drawings and particularly to FIG. 1, there is shown therein an exemplary embodiment of an automated banking machine generally indicated 10. In the exemplary embodiment, machine 10 comprises an ATM. However, it should be understood that the principles discussed herein may be used in connection with other types of automated transaction machines and banking machines.

Machine 10 includes a housing 12 which houses certain components of the machine. The components of the machine include input and output devices. In this exemplary embodiment the input devices include a card reader schematically indicated 14. Card reader 14 is operative to read a customer's card which includes information about the customer thereon, such as the customer's account number. In some embodiments the card reader 14 may be a card reader adapted for reading magnetic stripe cards and/or so called "smart cards" which include a programmable memory. Another input device in the exemplary embodiment includes input keys 16. Input keys 16 may in some embodiments be arranged in a keypad or keyboard. Input keys 16 may alternately or in addition include function keys or other types of devices for receiving manual inputs. It should be understood that in various embodiments other types of input devices may be used such as biometric readers, speech or voice recognition devices, inductance type readers, IR type readers, and other devices capable of communicating with a person, article or computing device, radio frequency type readers and other types of devices which are capable of receiving information that identifies a customer and/or his or her account.

The exemplary embodiment of machine 10 also includes output devices providing outputs to the customer. In the exemplary embodiment, machine 10 includes a display 18. Display 18 may include an LCD, CRT or other type display that is capable of providing visible indicia to a customer. In other embodiments, output devices may include devices such as audio speakers, RF transmitters, IR transmitters or other types of devices that are capable of providing outputs which may be perceived by a user either directly or through use of a computing device, article or machine. It should be understood that embodiments may also include combined input and output devices such as a touch screen display which is capable of providing outputs to a user as well as receiving inputs.

The exemplary embodiment of the automated banking machine 10 also includes a receipt printer schematically indicated 20. The receipt printer is operative to print receipts for users reflecting transactions conducted at the machine. Exemplary embodiments may also include other types of printing mechanisms such as statement printer mechanisms, ticket printing mechanisms, check printing mechanisms and other devices that operate to apply indicia to media in the course of performing transactions carried out with the machine. Exemplary embodiments may also include features described in U.S. Pat. No. 7,044,367, which is incorporated herein by reference.

Automated banking machine 10 further includes one or more controllers schematically indicated 22. Controller 22 includes one or more processors 23 that are in operative connection with a memory which is alternatively referred to herein as a data store, schematically indicated 24. The controller is operative to carry out programmed instructions to achieve operation of the machine in accomplishing transactions. As schematically indicated, the controller is in operative connection with a plurality of the transaction function devices included in the machine.

The exemplary embodiment of the ATM includes at least one communication device 26. The communications device may be one or more of a plurality of types of devices that enable the machine to communicate with remote computers and other systems and devices for purposes of carrying out transactions. For example, communications device 26 may include a modem for communicating messages over a data line or wireless network, with one or more other computers that operate to transfer data representative of the transfer of funds in response to transactions conducted at the machine. Alternately the communications device 26 may include various types of network interfaces, line drivers or other devices suitable to enable communication between the machine 10 and other computers and systems. Embodiments may also include features described in U.S. Pat. No. 7,003,492, which is incorporated herein by reference.

Machine 10 also includes a plurality of sensing devices for sensing various conditions in the machine. These various sensing devices are represented schematically by component 28 for simplicity and to facilitate understanding. It should be understood that a plurality of sensing devices are provided in the machine for sensing and indicating to the controller 22 the status of devices within the machine. Various types of sensing devices may generate analog and/or digital signals that correspond to sensed properties such as, for example, displacement, time, speed, acceleration and/or other measurable properties. In accordance with an exemplary embodiment, the operation of at least one exemplary sensing device is discussed in further detail below.

Automated banking machine 10 further includes a plurality of actuators schematically indicated 30 and 32. The actuators may comprise a plurality of devices such as motors, solenoids, cylinders, rotary actuators and other types of devices that are operative responsive to the controller 22. It should be understood that numerous components within the automated banking machine are operated by actuators positioned in operative connection therewith. Actuators 30 and 32 are shown to schematically represent such actuators in the machine and to facilitate understanding. In accordance with the invention, the operation of at least one actuator is disclosed in further detail below.

Machine 10 may also include in image capture device 34. Image capture device 34 may be operative to capture images of portions of a user. For example, images of the user's face may be captured for purposes of making records related to a transaction. Alternately, images of a user's face may be analyzed and used for purposes of identifying the user. In an exemplary embodiment, the image capture device 34 may be used to capture at least one image of an unauthorized user of the machine 10 in response to the indication of a suspect condition as will be explained in further detail below. Embodiments may include features described in U.S. Pat. No. 6,583,813, which is incorporated herein by reference.

In an exemplary embodiment, machine 10 may further include an alarm mechanism 36 that may be activated in response to the indication of a suspect condition. Additionally, communications device 26 may be utilized in a manner described below to alert persons at a remote location that a suspect condition has been indicated at machine 10.

Machine 10 further comprises at least one currency dispenser mechanism 38. The currency dispensing mechanism is operative responsive to the controller 22 to pick sheets and deliver them to a user through an opening 68 in the ATM housing. Sheets may be selectively picked by a picker mechanism 40 generally one at a time from a stack of sheets such as stack 42. In the exemplary embodiment, the stack of sheets is stored in a cassette 44. As schematically represented, the stack of sheets 42 is biased to engage the picker mechanism 40 by a biasing mechanism 52.

Notes that are dispensed from the cassette in the exemplary embodiment are engaged with a first note transport schematically indicated 54. Sheets dispensed from cassette 44 are enabled to engage the adjacent flights of belts and move in engagement therewith upward to a second transport 60. First note transport may be similar to that shown in U.S. Pat. No. 5,240,368, U.S. Pat. No. 6,484,380, or U.S. Pat. No. 6,315,194 the disclosures of which are incorporated by reference as if fully rewritten herein The second transport 60 in the exemplary embodiment may be similar to that shown in U.S. Pat. No. 5,240,368, U.S. Pat. No. 5,342,165, or U.S. Pat. No. 6,315,194 the disclosures of which are incorporated by reference as if fully rewritten herein. In response to operation of the controller 22 when a desired number of sheets have been collected in a stack 66 in a delivery position, the stack is moved in the manner of the incorporated disclosures so that stack 66 is moved outward toward the opening 68 in the housing 12 of the machine.

As the sheets are moved toward the opening 68, the controller operates to cause a suitable actuating device to operate a gate assembly 70 and move at least one gate thereof from a closed position to an open position so as to enable the stack to pass outward through the user opening. The exemplary transport stops with the stack extending outward from the opening. As a result the user is enabled to receive the sheets from the machine.

Figure 2:
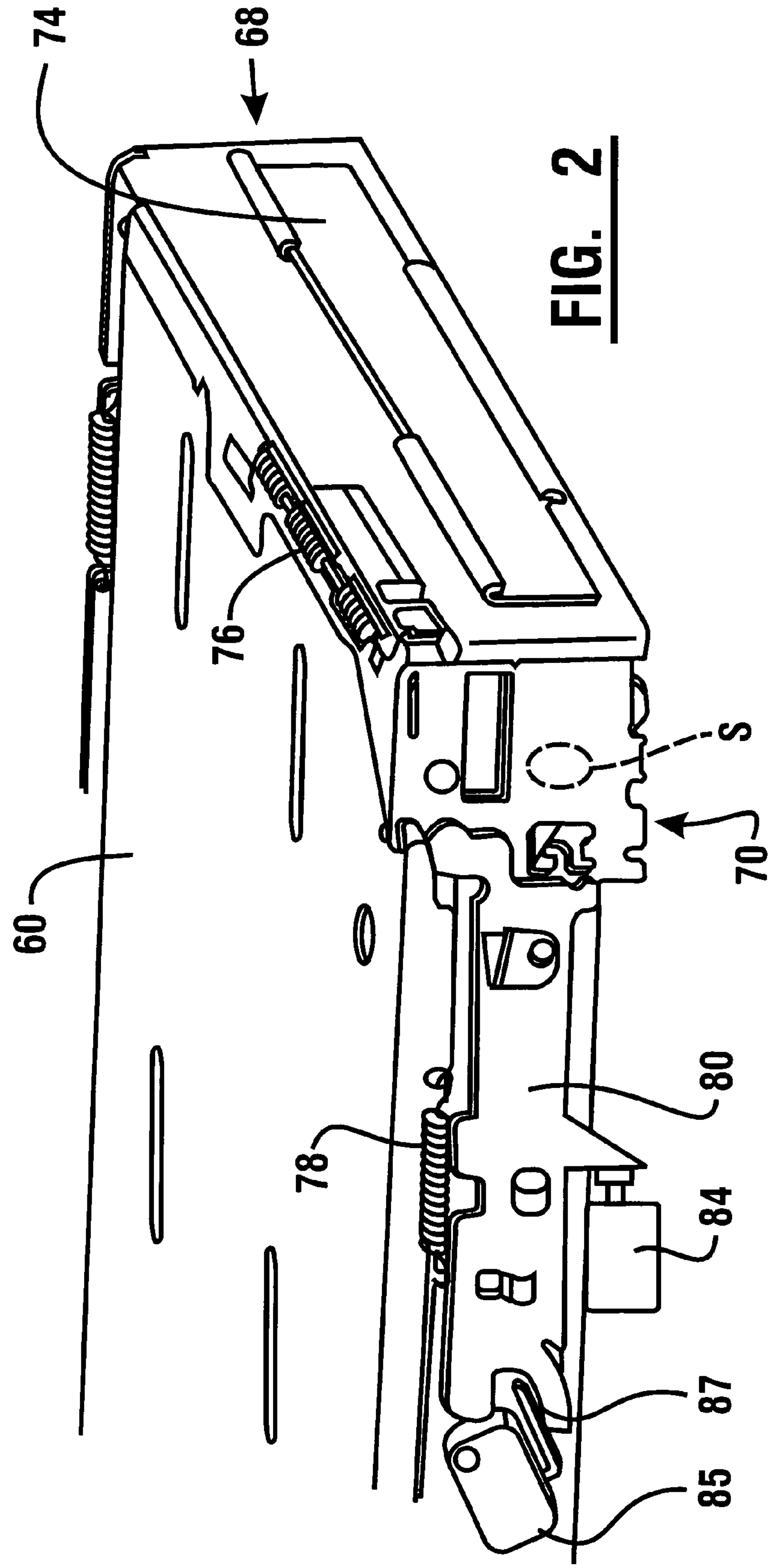
FIG. 2 is a partial isometric view showing a gate mechanism of the banking machine of the exemplary embodiment.

With reference to FIGS. 1 and 2, in the exemplary embodiment, gate assembly 70 is supported at a delivery end of second note transport 60. In the exemplary embodiment, gate assembly 70 includes a gate member 74, which is alternatively referred to as a gate. One or more biasing members 76, which in the exemplary embodiment comprise springs, pivotally urge gate member 74 toward a closed condition blocking the opening, and one or more biasing members 78 laterally urge gate member 74 toward the closed condition. Gate pivot member 80 is operably associated with an actuator 84. Actuator 84 is operative responsive to operation of the controller to move gate member 74 from the closed position to an open condition when a stack 66 in the delivery position is moved outward to present to a user. Of course this approach is exemplary.

In the exemplary embodiment, the gate member is operably associated with an analog sensor 85 which senses the position of the gate relative to the closed position based on the position of pivot member 80. In the exemplary embodiment, sensor 85 includes a movable finger 87 which engages gate pivot member 80 and provides at least one signal that corresponds to a current position of gate member 74. Of course signals produced by the sensor may be based on a reference other than the closed position, which in some embodiments may include a fixed or a variable reference.

During normal operation of the gate assembly, actuator 84 moves pivot member 80 laterally, which causes pivotal movement to open gate member 74. In a normal operation, the gate member 74 will be vertically and pivotally displaced from the closed position to the open position to enable a portion of stack 66 to move outward past the gate, so it may be taken by a user. Once the stack is sensed as extended through the opening, the controller operates to change the condition of the actuator so the gate is biased toward the closed position, but is held open by engagement of the gate member with the stack extending through the opening. When stack 66 is removed, gate member 74 returns to the closed position. Sensor 85 provides analog proportional signals associated with the positions of the gate member 74. The sensor 85 is in operative connection through an interface with one or more processors 23. In the exemplary embodiment, the signals produced by the sensor are analyzed through operation of the at least one processor, including comparing the signals and data stored in at least one data store corresponding to normal gate operation. In some exemplary embodiments, the stored data is previously stored through operation of the processor during normal dispensing and gate movement operations. If movement of the gate member 74, as represented by the generated signals as determined by the processor, falls within a programmed normal range, the controller causes the machine to continue normal operations.

In the exemplary embodiment, sensor 85 is operable to detect movement that corresponds to abnormal movement of gate member 74. For example, if no stack 66 is present, but the gate member 74 is displaced from the closed position, the sensor 85 generates at least one signal indicative of gate movement. Processor 23 is operative to analyze the generated signals relative to data corresponding to normal gate activity and thereby determine abnormal gate movement and a suspect condition. The at least one processor operates to generate at least one signal corresponding to determining the suspect condition. The machine 10 may then operate in accordance with its programming to take one or more protective actions.

In another example, when stack 66 is present and extends from the opening, under normal conditions, gate member 74 can be moved against the biasing force sufficiently to allow a user to remove stack 66 without damaging any bills. Biasing members 76, 78 urge gate member 74 toward a closed condition, applying pressure to hold the stack 66 extending from the opening. If gate member 74 is sensed as abnormally displaced away from stack 66 while the stack is present, or if gate member 74 remains open after stack 66 is removed, such abnormal gate movement is detected through signals from sensor 85. The processor analyzes the signals corresponding to movement of the gate to determine if the signals correspond to at least one suspect condition, and operates to cause the machine to take one action in response thereto.

As can be appreciated, the described approach has advantages compared to some ATM gate constructions, such as a machine that includes only a "gate closed" switch that indicates "not closed" as long as a stack remained untaken. In such constructions, during stack presentation operation, the gate member could be lifted fully open, away from the stack, or the gate held open for a time after stack removal, without the machine sensing any unusual activity regarding change in gate member condition. Thus it is more likely a trap or other device could be inserted into the opening, or the machine hardware otherwise compromised without detection of such actions.

In the exemplary embodiment, the analog sensor 85 which is operative to indicate the position of the gate relative to the closed position, in conjunction with processor 23 is operable to detect abnormalities in gate member movement, prompting the machine to take one or more protective actions. The protective actions may include running a screening test for problems or path obstructions, or other actions that can be taken by the machine responsive to operation of the processor upon determining that the gate movement corresponds to at least one abnormal or suspect condition.

In operation, when no transaction is occurring at the machine, the gate member 74 remains in a closed position and is locked from movement by the mechanism that can move the gate. During a transaction in which a stack of sheets are to be presented to a user, the gate member 74 moves away from a closed position in response to operation of the at least one processor 23. With the gate member in the open position, the machine 10 operates to cause a presenter to move the stack from a delivery position in which the stack is accumulated to extend the currency stack 66 outward through the user opening 68. As the stack is extended, the gate member 74 moves toward the closed position, but remains open in biased supporting connection with the stack 66.

The analog sensor 85 in operative connection with the gate member 74 is operable to generate at least one signal indicative of the extent that the gate member 74 is disposed away from the closed position. The generated signal is analyzed through operation of the processor and, responsive to stored data, determines if the signal corresponds to a suspect condition.

In the exemplary embodiment, the generated signals may indicate the possibility that a suspect condition exists. For example, in normal operation, the proportional signal generated by the sensor would indicate that the gate member is disposed a certain extent, say X, away from the closed position corresponding to the known quantity of currency sheets in stack 66. After the stack is sensed by other sensors such as the sensor schematically indicated S, is taken, the spring biased gate member 74 should spring shut, at which time the proportional signal would indicate that the gate member is in the closed position. A signal indicating a slight increase in X, for a limited period of time as the stack is pulled from the opening, would be considered within the normal movement of the gate member during the time that it is detected that the user is taking the stack.

However, if the proportional signal indicates an unexpected increase in the extent that the gate member 74 is disposed away from the closed position, such a situation would be identified by the processor as associated with a suspect condition. The gate member 74 may have been forced into a wider open condition for unlawful purposes. Since the gate member 74 is closed and locked during non-transaction periods, unscrupulous activity may occur during a transaction, when the gate member 74 is moved to an open condition. As noted above, in some gate assembly constructions, such activity would be undetectable by merely a "gate closed" switch. The system and methods of the exemplary embodiment address this problem.

In another exemplary embodiment, the sensor signals to the processor may be indicative of the amount of time that the gate member 74 is disposed away from the closed position. Thus, during normal operations, the signals produced responsive to the sensor would correspond to an amount of time normally associated with the gate member 74 being in an open condition, based on sensing removal of the stack. If during operation of the machine, a generated signal signifies that the time associated with the gate member being in an open condition is not consistent with the removal of the stack, a suspect condition is determined through operation of the processor.

In an exemplary embodiment, if the generated signals correspond to a suspect condition, the processor operates to cause the machine to operate to take at least one protective action. In one exemplary embodiment, the protective action can include a verification process. The verification process can be similar to that described in U.S. Pat. No. 6,315,194, previously incorporated herein. In the illustrative verification process, a single sheet, such as a test sheet may be first sent through the dispenser path to a delivery position adjacent the customer accessible opening. In executing the verification process, signals from at least sensor S located adjacent to the customer accessible outlet opening can be used to verify that the test sheet will reach the customer. The sensor S is operable to indicate to the controller whether the test sheet was in a position accessible to the customer. Of course this approach is exemplary.

A successful transport of the test sheet to determine the proper operability of the dispensing path may also be time dependent such that the test sheet must be sensed as reaching the destination within certain time parameters. The signals from the sensor sensing the test sheet are operative to indicate to the at least one processor that the sheet dispensing path has not been tampered with and that the machine may proceed to attempt to deliver additional sheets to the customer in the course of transactions that the customer may request.

Verification sensors such as sensor S may additionally be positioned at additional strategic locations, such as the entry and exit locations of the transport paths. It should be understood that sensors S along the sensing path may include sensors that directly sense sheets as well as sensors for gates, mechanisms or other devices which must operate to have a test sheet reach a customer.

In the execution responsive to the operation of the at least one processor of the exemplary verification process, if an unexpected condition is sensed, then the processor would indicate a fault and prevent further attempted dispensing operations of the machine and indicate that a malfunction has occurred.

The processor, upon the fault condition being determined, may automatically operate to cause the ATM to notify proper personnel of the fault condition. This could be done by the machine sending one or more messages to remote computers.

In an exemplary embodiment, the protective action can include operating an alarm mechanism to alert a person at a remote location that a suspect condition is indicated.

In an exemplary embodiment, the protective action can include operating a video image capture system. The image can be used to identify an unauthorized user who may be tampering with the machine.

In another exemplary embodiment, the protective action can include generating a service request. The service request can alert service personnel that the machine should be inspected for a possible security breach. Embodiments may include features described in U.S. Pat. No. 5,984,178, which is incorporated herein by reference.

In some exemplary embodiments, data corresponding to a plurality of normal signals produced by a sensing device responsive to normal movement of the gate member can be stored in a data store through operation of the processor. Normal movement of the gate member includes, for example, moving away from the closed position in response to an associated transaction step carried out by the machine responsive to operation of the processor. Normal movement of the gate member may also include the gate member being positioned away from the closed position an extent corresponding to the quantity of currency bills in the stack. The generated sensor signal is compared through operation of the processor to data corresponding to the plurality of normal signals to determine if a suspect condition is indicated.

In another exemplary embodiment, computer software instructions stored in the data store are executed by at least one processor to cause the ATM to carry out the methods disclosed herein.

In another exemplary embodiment, machine readable media includes the instructions that are executed by the at least one processor and operative to cause at least one processor in the ATM to carry out the methods disclosed herein. In exemplary embodiments, the media may include a hard drive, solid state memory, magnetic memory or other suitable media for storing such instructions.

In another exemplary embodiment, a method includes receiving a transaction request from a user through at least one input device of the ATM to carry out a transaction in which at least one sheet is dispensed to the user. The at least one sheet is moved from a storage area in the machine to a delivery position from which sheets are accumulated for delivery from the machine, responsive to operation of at least one processor in the machine. A gate member controlling access through an opening in a housing of the machine is moved responsive to operation of the at least one processor from a closed position to an open position. Thereafter, with the gate member in the open position, the machine is operated responsive to the at least one processor, to move the at least one sheet from the delivery position outward from the machine so as to extend through the opening, so that the user may take the at least one sheet. While in the open position, the gate member is biased against the at least one sheet extending in the opening as the gate is urged toward the closed position. At least one sensor, in operative connection with the gate member, generates at least one signal corresponding to the extent that the gate member is disposed from the closed position. The generated at least one signal is analyzed through operation of the at least one processor to determine if the at least one signal corresponds to a suspect condition. If the generated signal corresponds to a suspect condition, the at least one processor operates to cause the machine to operate to take at least one protective action.

In another exemplary embodiment, a method includes generating through at least one sensor in operative connection with a gate member, at least one signal corresponding to an extent of movement of the gate member, wherein the gate member controls access to an interior area of the machine through a currency delivery opening of an automated banking machine. The at least one signal is analyzed through operation of at least one processor to determine if the at least one signal corresponds to an unusual and/or suspect condition.

In another exemplary embodiment, a method includes generating through at least one sensor in operative connection with a gate member, a plurality of signals corresponding to normal movement of the gate member, wherein the gate controls access through a currency dispensing opening of an automated banking machine. Data corresponding to the plurality of generated signals are stored in at least one data store through operation of at least one processor of the automated banking machine. In a subsequent machine operation, at least one subsequent signal corresponding to a subsequent movement of the gate, is generated through operation of the at least one sensor in operative connection with the gate member. Thereafter, the at least one processor is utilized to analyze the subsequent signal relative to the stored data corresponding to the plurality of signals corresponding to normal operation, to determine if the at least one subsequent signal corresponds to an abnormal and/or suspect condition. If the at least one subsequent signal is determined by the at least one processor to correspond to a suspect condition, the at least one processor is operative to cause the machine to operate to take at least one protective action. The at least one protective action may include operating the at least one processor to cause the machine to conduct a verification process to test whether a sheet material dispensing path in the automated banking machine is unobstructed. Of course this approach is exemplary.

In one exemplary embodiment, the stored data corresponding to signals which correspond to normal movement of the gate member, are indicative of an extent that the gate member is disposed away from the closed position. This displacement may be based on the number of sheets in the presented stack as determined by the at least one processor. In another exemplary embodiment, the stored data corresponding to signals which correspond to normal movement of the gate member, are indicative of an amount of time that the gate is disposed from the closed position relative to stack movement. In other exemplary embodiments, the stored data may correspond to both displacement and time, and/or other sensed parameters such as, for example, acceleration, velocity, stress, power, voltage, amperage, force or other data usable to analyze gate operation.

For example, a suspect condition may be indicated if the at least one generated signal corresponds to a condition indicative of an increase in the extent that the gate member is disposed from the closed position after the gate member has moved toward the closed position to engage a stack. Because the gate member is biased toward the closed position, such an increase may indicate that the gate member is being forced toward the open position for insertion of a foreign object into the machine. Of course this approach is exemplary. If such a suspect condition arises, at least one processor causes the machine to take one or more protective actions, such as the types described. It should further be understood that while the exemplary embodiment has discussed that regard to currency dispensing gates, the principles may be applied to other types of ATM gates.

Thus the new and improved automated banking machines of the exemplary embodiments achieve at least one of the above stated objectives, eliminate difficulties encountered in the use of prior devices and systems, solve problems and attain the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the details shown and described.

In the following claims any feature described as a means for performing a function shall be construed as encompassing any means capable of performing the recited function, and shall not be limited to the structures shown herein or mere equivalents thereof.

Having described the features, discoveries and principles of the invention, the manner in which it is constructed and operated, and the advantages and useful results attained; the new an useful structures, devices, elements, arrangements, parts, combinations, systems, equipment, operations, methods, processes and relationships are set forth in the appended claims.

I claim:

1. A method comprising:

a) moving a gate member controlling access through an opening in a housing of an automated banking machine responsive to operation of at least one processor in the machine, wherein the gate member is moved from a closed position wherein the gate member blocks access through the opening, to an open position;

b) subsequent to (a) and with the gate member in the open position, operating the machine responsive to the at least one processor, to extend a stack comprising at least one currency bill outward from the machine through the opening, whereby the stack is enabled to be taken by a machine user from outside the machine;

c) during at least a portion of (b), moving the gate member towards the closed position, wherein the gate member is biased into supporting connection with the stack;

d) during at least a portion of (c) generating through at least one sensor in operative connection with the gate member, at least one signal corresponding to the extent the gate member is disposed from a reference position; and e) analyzing the at least one signal generated in (d) through operation of the at least one processor to determine if the at least one signal corresponds to at least one suspect condition.

2. The method according to claim 1 and further comprising:

f) responsive to determining in (e) that the at least one signal corresponds to at least one suspect condition, operating the at least one processor to cause the machine to operate to take at least one protective action.

3. The method according to claim 2 wherein in (f) the at least one protective action includes operating the at least one processor to conduct a currency dispense capability verification process.

4. The method according to claim 2 wherein in (f) the at least one protective action includes operating an alarm mechanism.

5. The method according to claim 2 wherein in (f) the at least one protective action includes operating a video image capture system.

6. The method according to claim 2 wherein in (f) the at least one protective action includes generating a service request to a remote server.

7. An article including computer executable instructions in operative connection with at least one processor in the automated banking machine, wherein the at least one processor is operative responsive to the instructions to cause the machine to carry out the method steps recited in claim 1.

8. Machine readable medium including instructions operative to cause at least one processor to cause an automated banking machine to carry out a method comprising:

(a) moving a gate member controlling access through an opening in a housing of the automated banking machine, wherein the gate member is moved from a closed position wherein the gate member blocks access through the opening, to an open position;

(b) subsequent to (a) and with the gate member in the open position, extending a stack comprising at least one currency bill outward through the opening, whereby the stack is enabled to be taken by a machine user from outside the automated banking machine;

(c) during at least a portion of (b), moving the gate member towards the closed position, wherein the gate member is biased into supporting connection with the stack;

(d) during at least a portion of (c), generating through at least one sensor in operative connection with the gate member, at least one signal corresponding to the extent the gate member is disposed from a reference position; and (e) analyzing the at least one signal generated in (d) to determine if the at least one signal corresponds to at least one suspect condition.

9. A method comprising:

a) receiving a request from a machine user through at least one input device on an automated banking machine, to conduct a transaction including the dispense of at least one sheet from the machine to the user;

b) moving the at least one sheet responsive to operation of at least one processor in the machine, wherein the at least one sheet is moved from a storage area in the machine to a delivery position from which sheets are moved in delivering sheets from the machine;

c) moving a gate member controlling access through an opening in a housing of the automated banking machine responsive to operation of the at least one processor, wherein the gate member is moved from a closed position wherein the gate member blocks access through the opening, to an open position;

d) subsequent to (c) and with the gate member in the open position, operating the machine responsive to the at least one processor, to move the at least one sheet from the delivery position to a presented position in which the at least one sheet extends outward from the machine through the opening, whereby the at least one sheet is enabled to be taken by the machine user;

e) during at least a portion of (d), moving the gate member towards the closed position, wherein the gate member is biased into supporting connection with the at least one sheet in the presented position;

f) during at least a portion of (e) generating through at least one sensor in operative connection with the gate member, at least one signal corresponding to the extent the gate member is disposed from the closed position;

g) analyzing the at least one signal generated in (f) through operation of the at least one processor to determine if the at least one signal corresponds to at least one suspect condition; and h) responsive to determining in (g) that the at least one signal corresponds to at least one suspect condition, operating the at least one processor to cause the machine to operate to take at least one action.

10. A method comprising:

a) generating through at least one sensor in operative connection with a gate member of a cash dispensing automated banking machine, at least one first signal corresponding to normal movement of the gate member which controls access through a currency dispensing opening of the automated banking machine, wherein the at least one first signal is generated responsive to the gate moving from a closed position wherein the gate member blocks access through the currency delivery opening, to an open position during at least one cash dispensing operation carried out with the machine;

b) storing data corresponding to the at least one first signal generated in (a) through operation of a processor, in at least one data store of the automated banking machine;

c) subsequent to (b), generating through the at least one sensor, at least one subsequent signal corresponding to movement of the gate member during a subsequent cash dispensing operation carried out with the machine;

d) operating the at least one processor responsive to the data stored in the data store and the at least one subsequent signal generated in (c) to determine if a suspicious activity occurred during the subsequent cash dispensing transaction.

11. The method according to claim 10 and further comprising:

e) responsive to determining in (d) that the suspicious activity occurred, operating the at least one processor to cause the machine to operate to take at least one protective action.

12. The method according to claim 11 wherein in (e) the at least one protective action includes operating the at least one processor to cause the machine to conduct a verification process to test whether a sheet material dispensing path in the automated banking machine is unobstructed.

13. The method of claim 10 wherein in (a) the at least one first signal corresponding to normal movement of the gate member includes at least one signal indicative of an extent that the gate member is disposed from the closed position.

14. The method of claim 10 wherein in (a) the at least one first signal corresponding to normal movement of the gate member includes at least one signal indicative of at least one period of time that the gate member is disposed from the closed position.

15. The method according to claim 13 wherein in (a) the at least one first signal further includes at least one signal indicative of at least one period of time that the gate member is disposed from the closed position.

16. The method according to claim 10 and further comprising:

e) operating the at least one processor responsive to the determination in (d), to stop performing further cash dispensing transactions through operation of the machine.

* * * * *